US012112273B2

(12) United States Patent
Asghar et al.

(10) Patent No.: US 12,112,273 B2
(45) Date of Patent: Oct. 8, 2024

(54) MEASURING RISK WITHIN A MEDIA SCENE

(71) Applicant: International Business Machines Corporation, Armonk, NY (US)

(72) Inventors: Ahsan A. Asghar, Punjab (PK); Freddy Lorge, Vedrin (BE); David Brian Callies, Spring, TX (US)

(73) Assignee: International Business Machines Corporation, Armonk, NY (US)

(*) Notice: Subject to any disclaimer, the term of this patent is extended or adjusted under 35 U.S.C. 154(b) by 919 days.

(21) Appl. No.: 16/923,313

(22) Filed: Jul. 8, 2020

(65) Prior Publication Data

US 2021/0350256 A1 Nov. 11, 2021

(51) Int. Cl.
*G06N 5/04* (2023.01)
*G06N 20/00* (2019.01)
*G06V 20/40* (2022.01)
*G06V 20/52* (2022.01)

(52) U.S. Cl.
CPC .............. *G06N 5/04* (2013.01); *G06N 20/00* (2019.01); *G06V 20/41* (2022.01); *G06V 20/52* (2022.01)

(58) Field of Classification Search
CPC ............ G06N 5/04; G06N 20/00; G06N 5/00; G06V 20/41; G06V 20/53; G06V 20/52; G06V 20/46; G05B 13/02; G05B 13/00
See application file for complete search history.

(56) References Cited

U.S. PATENT DOCUMENTS

| 7,382,244 | B1 | 6/2008 | Donovan et al. |
| 7,920,626 | B2 | 4/2011 | Fernandez et al. |
| 9,686,217 | B2 | 6/2017 | Prabhu |
| 9,762,462 | B2 | 11/2017 | Cherifi et al. |
| 2014/0280638 | A1 | 11/2014 | O'Dell et al. |
| 2016/0283799 | A1 | 11/2016 | Carey |

(Continued)

FOREIGN PATENT DOCUMENTS

| CA | 2878755 A1 | 7/2016 | |
| EP | 3159235 A1 * | 4/2017 | ............ B60W 30/09 |

OTHER PUBLICATIONS

Baldwin, Roberto. "Tesla's Video Shows What Full Self-Driving Autopilot Sees", Feb. 3, 2020, https://www.caranddriver.com/news/a30733506/tesla-autopilot-full-self-driving-video/ (Year: 2020).*

(Continued)

*Primary Examiner* — Vincent Gonzales
(74) *Attorney, Agent, or Firm* — Yee & Associates, P.C.

(57) ABSTRACT

Measuring risk intensity level of a scene captured within media is provided. A score is generated, using a computational scoring model, for each risk type, cause, and evidence taxon element described in a risk taxonomy corresponding to a scene class by matching one or more taxon elements with each attribute of each detected object of a set of detected objects within the scene captured by the media. The media of the scene is tagged with risk type, cause, and evidence scores of each taxon element of the risk taxonomy corresponding to the scene class. A risk intensity level of the scene is calculated based on the risk type, cause, and evidence scores tagged to the media. An action of a set of defined actions is performed based on the risk intensity level of the scene.

20 Claims, 12 Drawing Sheets

(56) References Cited

U.S. PATENT DOCUMENTS

2017/0337425 A1    11/2017    Lee et al.
2018/0278894 A1    11/2018    Kanga et al.

OTHER PUBLICATIONS

Jähne, Bernd, and Horst Haussecker. Computer Vision and Applications. Ed. Bernd Jähne and Horst Haussecker. San Diego, California: Academic Press, 2000. Print. (Year: 2000).*

Stewart, Robert, Marie Urban, Samantha Duchscherer, Jason Kaufman, April Morton, Gautam Thakur, Jesse Piburn, and Jessica Moehl. "A Bayesian machine learning model for estimating building occupancy from open source data." Natural Hazards 81 (2016): 1929-1956.) (Year: 2016).*

Brahnam et al., "Design of a Bullying Detection/Alert System for School-Wide Intervention," Human-Computer Interaction: Interaction Technologies, Copyright Springer International Publishing 2015, Switzerland, pp. 1-11.

Lavanya et al., "Mobile Embedded Wireless Sensor Network to Prevent Deforestation," International Journal on Recent and Innovation Trends in Computing and Communication, Vo. 2, Issue 7, pp. 2045-2048.

Mutiara et al., "Wireless Sensor Network for Illegal Logging Application: A Systematic Literature Review," Journal of Theoretical and Applied Information Technology, vol. 96, No. 1, Jan. 15, 2019, pp. 302-313.

Soma et al., "An Automatic System for Controlling Deforestestation Using an IoT and GSM," International Conference on Recent Trends in Computational Engineering and Technologies (ICTRCET), Jan. 2019, pp. 780-785.

Vala et al., "FearNot! demo: a virtual environment with synthetic characters to help bullying," The Sixth International Joint Conference on Autonomous Agents and Multi-Agent Systems (AAMAS 07), May 2007, pp. 1381-1382.

IBM Video Analytics, "Turn video into actionable Insights," accessed Mar. 16, 2020, 4 pages. https://www.ibm.com/us-en/marketplace/video-analytics?mhsrc=ibmsearch_a&mhq=video%20analytics.

Haidar et al., "Multilingual cyberbullying detection system: Detecting cyberbullying in Arabic content," Advances in Science, Technology and Engineering Systems Journal, 2017, vol. 2, No. 6, pp. 275-284.

Anonymous, "Intelligent video surveillance in retail based on customer behavior and articles movement inside shop area," An IP.com Prior Art Database Technical Disclosure, Oct. 1, 2018, IPCOM000255531D, 2 pages. https://priorart.ip.com/IPCOM/000255531.

Xu et al., "Fast Learning for Sentiment Analysis on Bullying," First International Workshop on Issues of Sentiment Discovery and Opinion Mining (WISDOM,) Aug. 2012, Article No. 10, 6 pages.

Chen et al., "Improving the Implementation of Sensor Nodes for Illegal Logging Detection," International Conference on Intelligent Information Hiding and Multimedia Signal Processing, Nov. 26-28, 2018, Sendai, Japan, vol. 2, 8 pages.

Liaw et al., "A Novel Vibration-Based Real-Time Monitoring System for Illegal Logging," Lecture Notes in Electrical Engineering, LNEE, vol. 425, Jun. 2018, 8 pages.

\* cited by examiner

MEASURING RISK WITHIN A MEDIA SCENE

BACKGROUND

1. Field

The disclosure relates generally to risk analysis and more specifically to measuring risk intensity level of a scene captured within media and performing a set of actions based on the measured risk intensity level.

2. Description of the Related Art

Risk is an uncertain event or condition that, if it occurs, has an effect. For example, risk has the potential for uncontrolled loss of something of value. Values may include, for example, personal safety, financial wealth, activity performance, object safety, and the like, which can be lost when taking risk resulting from a given event or condition, foreseen or unforeseen.

Risk analysis helps to define preventive measures to reduce the probability of these events or conditions from occurring and identify countermeasures to successfully deal with these events or conditions when they develop to avert possible negative effects. Risk management is the identification, evaluation, and prioritization of risks followed by coordinated application of resources to minimize, monitor, and control the probability or impact of these events or conditions. Strategies to manage risk (i.e., uncertainties with negative consequences) may include, for example, avoiding the risk completely or reducing the negative effect or probability of the risk.

SUMMARY

According to one illustrative embodiment, a computer-implemented method for measuring risk intensity level of a scene captured within media is provided. A computer, using a computational scoring model, generates a score for each risk type, cause, and evidence taxon element described in a risk taxonomy corresponding to a scene class by matching one or more taxon elements with each attribute of each detected object of a set of detected objects within the scene captured by the media. The computer tags the media of the scene with risk type, cause, and evidence scores of each taxon element of the risk taxonomy corresponding to the scene class. The computer calculates a risk intensity level of the scene based on the risk type, cause, and evidence scores tagged to the media. The computer performs an action of a set of defined actions based on the risk intensity level of the scene. According to other illustrative embodiments, a computer system and computer program product for measuring risk intensity level of a scene captured within media are provided.

DETAILED DESCRIPTION

Figure 1:
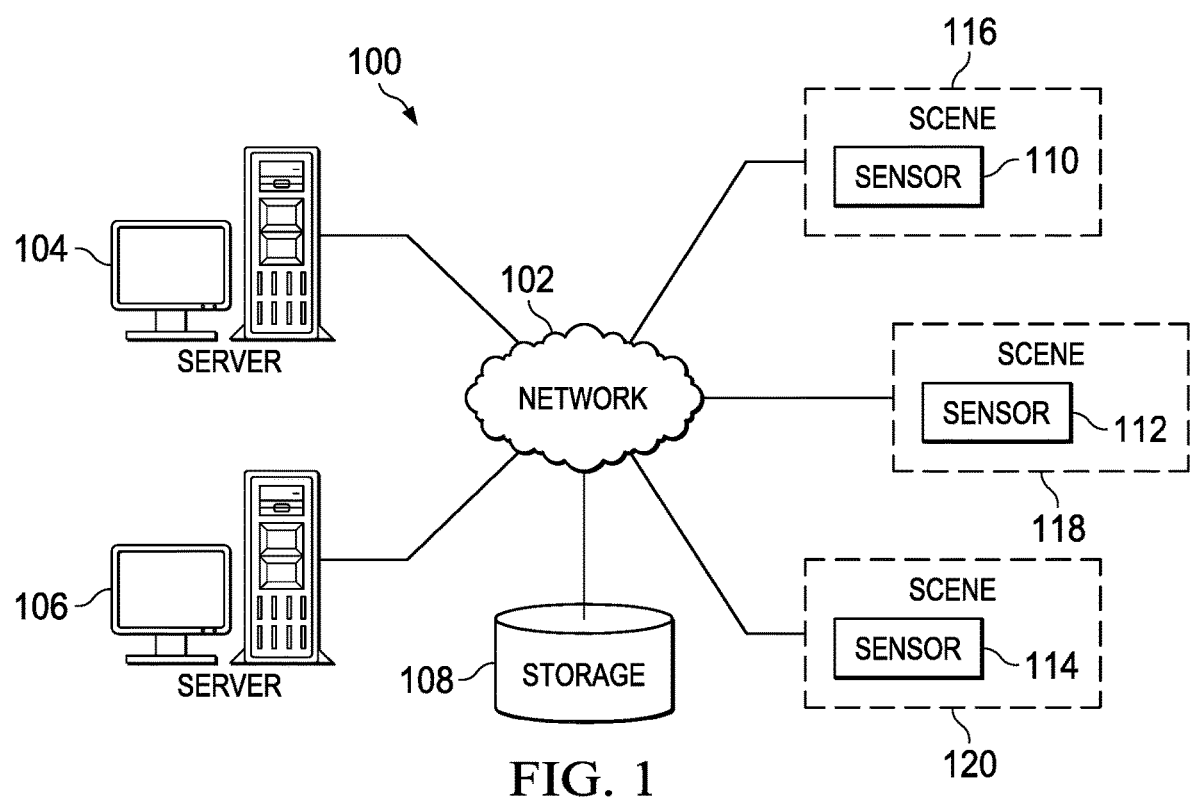
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, sensors, and other devices in which the illustrative embodiments may be implemented. Network data processing system 100 contains network 102, which is the medium used to provide communications links between the computers, data processing systems, sensors, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide risk management services by measuring risk intensity level of a scene captured within media and performing a set of actions based on the measured risk intensity level. Also, it should be noted that server 104 and server 106 may each represent a cluster of servers in one or more data centers. Alternatively, server 104 and server 106 may each represent multiple computing nodes in one or more cloud environments.

Sensor 110, sensor 112, and sensor 114 also connect to network 102. Sensors 110, 112, and 114 are data feeders to server 104 and server 106. Each of sensors 110, 112, and 114 represents a set of one or more sensors with wire or wireless communication links to network 102. A set of sensors may include, for example, one or more imaging devices, such as video cameras, still picture cameras, infrared cameras, and the like, and one or more sound capturing devices, such as microphones and the like. Further, sensor 110, sensor 112, and sensor 114 are capable of capturing and sending a live media feed in real time of scene 116, scene 118, and scene 120, respectively, to server 104 and server 106 for analysis of risk to objects captured within scenes 116, 118, and 120. Scenes 116, 118, and 120 may represent similar scenes or different scenes. For example, scene 116 may be an airport runway scene, scene 118 may be an airport terminal scene, and scene 120 may be an airport luggage handling area scene. However, it should be noted that illustrative embodiments are not limited to analyzing airport scenes for risk, but may analyze any type of scene, such as, for example, a construction site, school playground, theme park, and the like. Also, objects captured within a particular scene may include, for example, animate objects, such as people, animals, vegetation, and the like, and inanimate objects, such as, vehicles, luggage, equipment, tools, and the like.

Storage 108 is a network storage device capable of storing any type of data in a structured format or an unstructured format. In addition, storage 108 may represent a plurality of network storage devices. Further, storage 108 may store identifiers and network addresses for a plurality of different sensors, identifiers for a plurality of different scenes, a plurality of different captured media, a plurality of scene class definitions, a plurality of object type definitions, a plurality of object attribute definitions, a plurality of risk taxonomies, a plurality of different machine learning models, and the like. Furthermore, storage 108 may store other types of data, such as authentication or credential data that may include user names, passwords, and biometric data associated with security analysts, system administrators, and users, for example.

In addition, it should be noted that network data processing system 100 may include any number of additional servers, sensors, scenes, storage devices, and other devices not shown. Program code located in network data processing system 100 may be stored on a computer readable storage medium and downloaded to a computer or other data processing device for use. For example, program code may be stored on a computer readable storage medium on server 104 and downloaded to sensor 110 over network 102 for use on sensor 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

Figure 2:
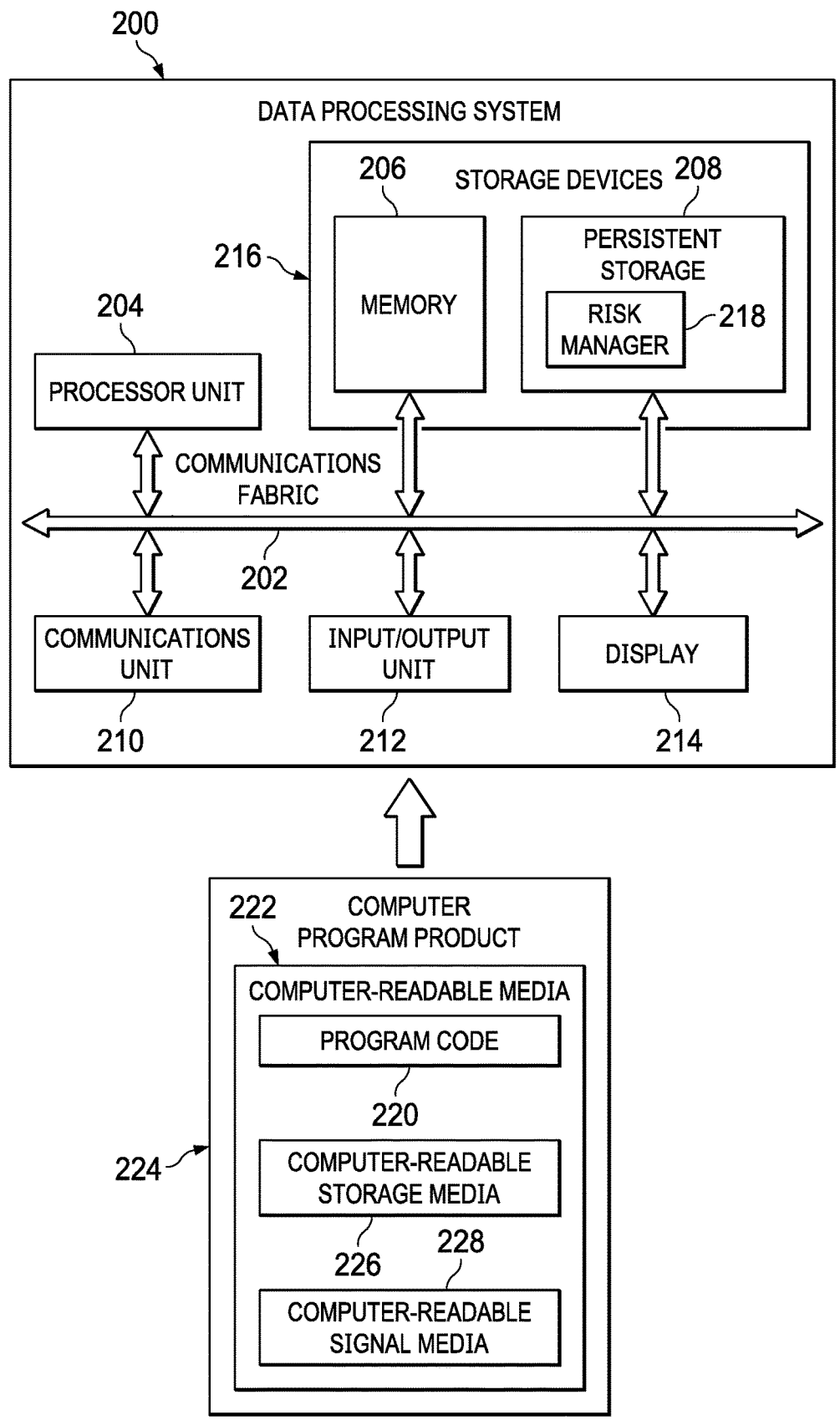
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing risk management processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis or a persistent basis. Further, a computer readable storage device excludes a propagation medium. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores risk manager 218. However, it should be noted that even though risk manager 218 is illustrated as residing in persistent storage 208, in an alternative illustrative embodiment risk manager 218 may be a separate component of data processing system 200. For example, risk manager 218 may be a hardware component coupled to communication fabric 202 or a combination of hardware and software components. In another alternative illustrative embodiment, a first set of components of risk manager 218 may be located in data processing system 200 and a second set of components of risk manager 218 may be located in a second data processing system, such as, for example, server 106 in FIG. 1. Risk manager 218 controls the process of measuring risk intensity level of a scene captured within media and performing a set of actions based on the measured risk intensity level.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, short-wave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 220 is located in a functional form on computer readable media 222 that is selectively removable and may be loaded onto or transferred to data processing system 200 for running by processor unit 204. Program code 220 and computer readable media 222 form computer program product 224. In one example, computer readable media 222 may be computer readable storage media 226 or computer readable signal media 228.

In these illustrative examples, computer readable storage media 226 is a physical or tangible storage device used to store program code 220 rather than a medium that propagates or transmits program code 220. Computer readable storage media 226 may include, for example, an optical or magnetic disc that is inserted or placed into a drive or other device that is part of persistent storage 208 for transfer onto a storage device, such as a hard drive, that is part of persistent storage 208. Computer readable storage media 226 also may take the form of a persistent storage, such as a hard drive, a thumb drive, or a flash memory that is connected to data processing system 200.

Alternatively, program code 220 may be transferred to data processing system 200 using computer readable signal media 228. Computer readable signal media 228 may be, for example, a propagated data signal containing program code 220. For example, computer readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 222" can be singular or plural. For example, program code 220 can be located in computer readable media 222 in the form of a single storage device or system. In another example, program code 220 can be located in computer readable media 222 that is distributed in multiple data processing systems. In other words, some instructions in program code 220 can be located in one data processing system while other instructions in program code 220 can be located in one or more other data processing systems. For example, a portion of program code 220 can be located in computer readable media 222 in a server computer while another portion of program code 220 can be located in computer readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Detection of events, conditions, situations, interactions, and the like within a scene, which may involve random movements of animate objects, such as people and animals, and inanimate objects, such as vehicles (e.g., autonomous, semi-autonomous, and manually-operated cars, trucks, buses, trains, motorcycles, bicycles, aircraft, watercraft, and the like), is needed where an alert should be raised because of, for example, risk to individual safety or health, risk to animal safety or health, risk to safety of other objects, such as articles or items (e.g., luggage, equipment, and the like), risk to area location safety, risk to activity safety, and the like. The scene may be, for example, an airport, bus terminal, train station, shipyard, construction site, office building, school building, library, government building, healthcare facility, store, parking lot, house, yard, park, water park, theme park, sport venue, entertainment venue, or the like.

Illustrative embodiments are capable of detecting abnormal events, conditions, situations, and interactions that may present risk by performing risk analysis, which may lead to risk avoidance, accident prevention, and the like. For example, illustrative embodiments may provide employee or customer safety while walking in a store or parking lot, luggage safety while in an airport, ground crew safety while loading or maintaining an airplane, and the like via analysis of media capturing the scene for a level of risk. However, it should be noted that illustrative embodiments account for data privacy, notice of data capture, limited retention, transparency, opt in (where applicable), and the like. Further, even though specific scene examples are utilized in this specification (e.g., airport), illustrative embodiments may be applied to any scene.

Illustrative embodiments analyze media, such as, for example, live media feeds of videos, still pictures, audio, or any combination thereof, of a scene; detect risks to objects in the scene captured by the media (e.g., whether an individual is too close to a jet engine, an individual is improperly handling luggage marked as fragile, or an individual is working in a noisy environment without noise cancelling headphones); evaluate the risk intensity level to objects in the scene; and take appropriate action based on the risk intensity level. Thus, illustrative embodiments are applicable to all scenes where an alert should be raised or an action performed based on detection of risk intensity level to any object in a scene above a threshold. Further, even though solutions already exist that are capable of detecting objects in video via machine learning, no current solution is capable of scoring a risk intensity level of a scene, which is essential information in order to take immediate and appropriate action when automatically processing media capturing the scene in real time.

Thus, illustrative embodiments provide one or more technical solutions that overcome a technical problem with how to detect and measure risk to objects within a scene captured by media. As a result, these one or more technical solutions provide a technical effect and practical application in the field of risk analysis and management.

Figure 3:
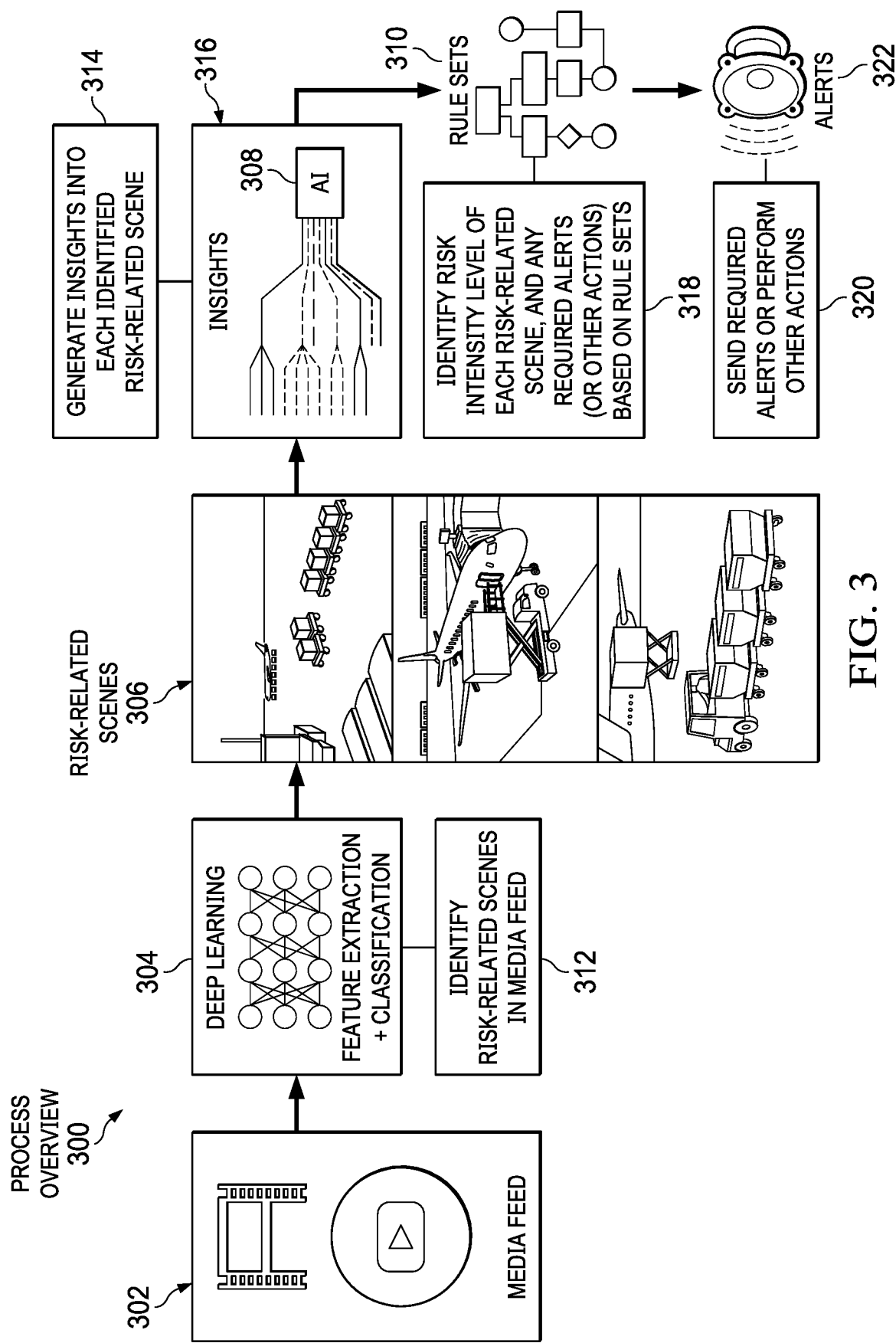
FIG. 3 is a diagram illustrating a process overview in accordance with an illustrative embodiment.

With reference now to FIG. 3, a diagram illustrating a process overview is depicted in accordance with an illustrative embodiment. Process overview 300 may be implemented in a network of data processing systems, such as network data processing system 100 in FIG. 1. Process overview 300 includes a system of hardware and software components for measuring risk intensity level of a scene captured within media and performing a set of actions based on the measured risk intensity level.

In this example, process overview 300 includes media feed 302, deep learning component 304, risk-related scenes 306, artificial intelligence component 308, and rule sets 310. A server, such as, for example, server 104 in FIG. 1, receives media feed 302 from one or more sensors, such as, for example, sensors 110, 112, and 114 in FIG. 1, which capture one or more scenes, such as, for example, scenes 116, 118, and 120 in FIG. 1.

In this example, media feed 302 is a live media feed in real time of risk-related scenes 306, which in this example are different airport scenes. At 312, the server utilizes deep learning component 304 to detect risk-related scenes 306 in media feed 302. At 314, the server utilizes artificial intelligence component 308 to generate insights 316 into each of detected risk-related scenes 306. Artificial intelligence component 308 may utilize, for example: machine learning, which may include deep learning, supervised learning, and unsupervised learning; natural language processing, which may include classification, machine translation, question answering, and text generation; expert systems; vision, which may include image recognition and computer vision; speech, which may include speech to text and text to speech; planning; and the like. Insights 316 are insights into risks to objects captured within the scenes.

At 318, the server detects the risk intensity level of each of risk-related scenes 306 and any required alerts or other actions based on rule sets 310. At 320, the server sends required alerts 322 or performs other actions based on the detected risk intensity level of each of risk-related scenes 306. Thus, the server detects the class of a scene in the media, extracts scene specific risk insights, and computes scene risk intensity level in order to automatically take appropriate actions. For example, the server may detect that a video relates an "airport individual-risk" scene with a high-risk level for bodily injury and automatically alert security personnel, supervisors, and/or workers in the area of the detected risk.

Figure 4:
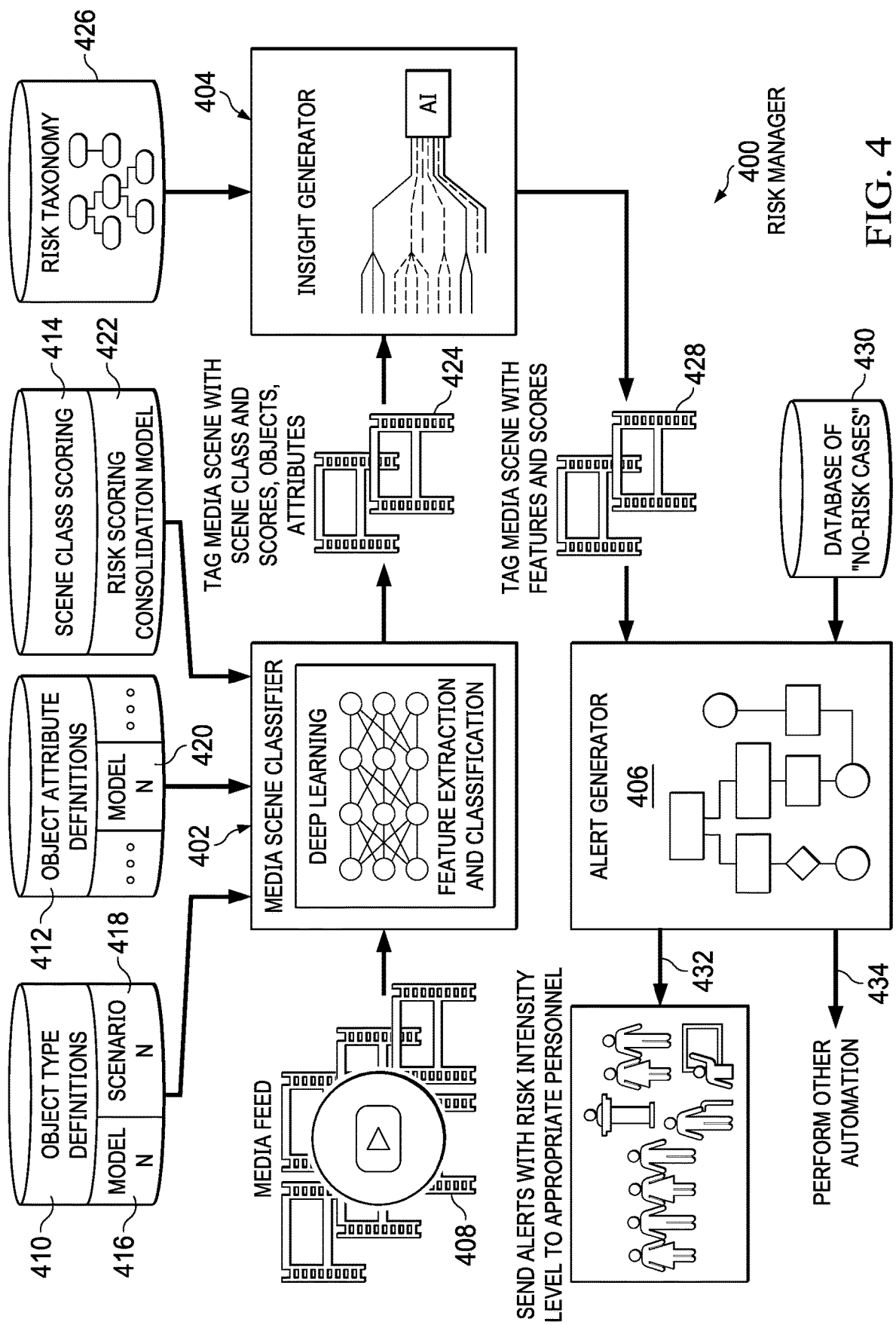
FIG. 4 is a diagram illustrating an example of components of a risk manager in accordance with an illustrative embodiment.

With reference now to FIG. 4, a diagram illustrating an example of components of a risk manager is depicted in accordance with an illustrative embodiment. Risk manager 400 may be implemented in a computer, such as, for example, server 104 in FIG. 1 or data processing system 200 in FIG. 2. In addition, risk manager 400 may be, for example, risk manager 218 in FIG. 2.

In this example, risk manager 400 includes media scene classifier 402, insight generator 404, and alert generator 406. However, it should be noted that risk manager 400 is intended as an example only and not as a limitation on illustrative embodiments. In other words, risk manager 400 may include more or fewer components than illustrated. For example, a component may be divided into two or more components, two or more components may be combined into one component, a component not shown may be added, or a component that is shown may be removed.

Media scene classifier 402 utilizes machine learning models, such as, for example, deep learning, to detect objects and attributes of the detected objects, score the object attributes, and score the scene captured by media feed 408 in relation to a scene class. Media feed 408 may be, for example, media feed 302 in FIG. 3.

In this example, media scene classifier 402 receives inputs from object type definitions 410, object attribute definitions 412, and scene class scoring 414. Object type definitions 410 are definitions for different types of objects corresponding to different scene classes and include object machine learning models 416 and scenarios 418. Object attribute definitions 412 are definitions for different attributes of each different object corresponding to different scene classes and include object attribute machine learning models 420. Scene class scoring 414 calculates scoring for different scene classes and includes risk scoring consolation model 422.

Object machine learning models 416 detect object types specific to a particular scene class. For example, a particular scene class may be an "individual-risk" class, with objects such as an airline worker's countenance, expression, or posture, an aircraft, or any other specific objects in a scene (e.g., runway vehicles, baggage loaders, and the like) or an "article-risk" class, with objects such as baggage handlers, luggage, suitcases, trunks, bags, and the like. In addition, media scene classifier may assign a scene several classes, depending on the objects detected in the scene.

Object attribute machine learning models 420 detect object attributes specific to an object type within a scene class. Each respective object attribute machine learning model independently scores an attribute of an object. For every detected object type, media scene classifier 402 applies all related object attribute machine learning models one after another and utilizes their generated scores in a corresponding scenario of scenarios 418 to compute an individual object risk score. The particular scenario depends on the object type.

Examples of object attribute machine learning models 420 scoring attributes of detected objects may include: a detected object type "countenance" may have a corresponding model that recognizes and scores expressions or feelings on an individual's countenance (e.g., a model that recognizes/scores a "startled expression" on a countenance, a model that recognizes/scores a 'strained expression' on a countenance, and the like); a detected object type "individual" may have a corresponding model that recognizes and scores the position of an individual (e.g., a model that recognizes/scores an uncomfortable position of an individual and the like); a detected object type "individual" may have a corresponding model that recognizes and scores "specific activity clothing" (e.g., uniform corresponding to a particular job or activity) of an individual (e.g., a model that recognizes/scores "luggage handler clothes", a model that recognizes/scores "runway staff clothes", and the like); a detected object type "individual" may have a corresponding model that recognizes and scores "safety accessories" (e.g., a model that recognizes/scores "protective headgear" (e.g., hardhat), a model that recognizes/scores "protective earwear" (e.g., sound cancelling headphones, earplugs, and the like); a detected object type "individual" may have a corresponding model that recognizes and scores a "gesture" of an individual (e.g., a model that recognizes/scores a typical "aircraft marshal gesture", a model that recognizes/scores a typical "luggage handler gesture", and the like); a detected object type "area" may have a corresponding model that recognizes and scores accessibility of an area (e.g., a model that recognizes/scores a "restricted area" and the like); a detected object type "vehicle" may have a corresponding model that recognizes and scores the position of the vehicle, speed of the vehicle, or shape of the vehicle (e.g., a model that recognizes/scores a "sharp edge" of the vehicle and the like); and a detected object type "article" may have a corresponding model that recognizes and scores a tear in a suitcase, a model that recognizes and scores a dent on a suitcase, a model that recognizes and scores instability of a suitcase, and the like.

At the end of the individual object attribute scoring process, every detected object of the scene class has one individual risk score within a presumed scene class (i.e., the score is a combination of all scores provided by object attribute machine learning models 420). The combination is according to a predefined scenario in scenarios 418 (e.g., the easiest scenario may be just adding the scores of every object attribute machine learning model). For example, "runway staff clothes" may have a low score to no score in an "airport luggage-risk" scene and a high score in an "airport individual-risk" scene. The score provided by an object attribute machine learning model may be, for example, the matching percentage provided by that model. For example, the probability that an attribute of a given individual is "protective headwear" (i.e., probability that this individual is wearing protective headwear). As another example, the probability that an attribute of a suitcase is a "dent" (i.e., probability that this suitcase has a dent). Media scene classifier 402 can weight this score by the matching percentage provided by the class machine learning model that detected the object type. In addition, this score can be weighted by a factor representing the significance or relevance of the attribute in the class of the scene (e.g., an "injury of an individual" may have more weight in a "airport individual-risk" scene rather than in a "airport luggage-risk" scene).

It should be noted that each machine learning model is a plug-in or cartridge that can be added or incorporated into risk manager 400. Plugging in a new machine learning model automatically enriches risk manager 400 (e.g., providing a possibility of detecting a new type of object in the object detection phase or fine-tuning scores in the individual object attribute scoring phase).

Media scene classifier 402 utilizes scene class scoring 414 to consolidate all the individual scores of the objects and their attributes into one "scene score". Scene class scoring 414 can utilize rules provided by an experienced user to perform the scores consolidation. Alternatively, scene class scoring 414 may utilize a machine learning model (i.e., risk scoring consolidation model 422) to perform the scores consolidation. Examples of score consolidators may include: a certain number of "individual" objects with a "vehicle" object in the same scene may increase the score of an "individual-risk" scene; the combination of a "strained expression" attribute with an "uncomfortable position" attribute may increase the score of an "individual-risk" scene; and the like. Other examples of score consolidators may include: a certain number of "luggage" objects above a threshold level will increase the score of a "luggage-risk" scene; and the combination of "luggage handler clothing" with "suitcase", "bag" or "trunk" captured in media feed 408 may increase the score of a "luggage-risk" scene.

Media scene classifier 402 assigns media feed 408 (e.g., video), which has a consolidated score above a defined threshold level, with the class associated with the presumed scene class. The defined threshold level is tunable according to user experience or machine learning. At 424, media scene classifier 402 tags media feed 408 with the scene class score, the detected object types, attributes of the detected objects, and scores of individual attributes. Media scene classifier 402 can either analyze media feed 408 for one specific class or for all available classes in order to assign media feed 408 the most probable class (i.e., the class with the highest score).

Insight generator 404 provides risk insights into the scene through detection and scoring of features depicting the media scene, using risk taxonomy 426, which is specific to the scene class. It should be noted that an artificial intelligence component, such as, for example, artificial intelligence component 308 in FIG. 3, can build risk taxonomy 426. The result is insight generator 404 tagging the media scene with the scene class, detected objects and their attributes, detected risk features, along with corresponding scores.

Risk manager 400 utilizes insight generator 404 to detect insights into risk captured in media feed 408. To make insight generator 404 specific to the scene being analyzed, insight generator 404 is coupled to risk taxonomy 426, which contains insights related to the class of the scene. In the case of an "airport individual-risk" class, risk taxonomy 426 would describe, for example, the different types of risks, types of risk causes, types of cause evidences, and the relationships between these different types for that specific scene class.

For example, using the case of the "airport individual-risk" scene: the risk types may be "individual risks", "group risks", and the like; "individual risks" may include the sub-types, such as "injury", "health", and the like, each with a possibility of a different severity level as yet another subtype; "group risks" may include the same sub-types with additional sub-types, such as "injury" includes the sub-type "body", which may include the sub-types "head", "leg", "arm", and the like; and a "group risk" of type "severe injury" may be caused by a "fire", which may be attested to by the evidence of "flames", "smoke", or indirectly any object likely to create a fire. Causes of risks may include, for example; wrong posture, with sub-types of wrong posture of arms, legs, body, and the like; wrong position of luggage, wrong individual, or other wrong objects in an area, with several area subtypes, such as "area for luggage loader", "area for runway vehicles", "area for runway staff", and the like; presence of a "runway vehicle" in an area that is not an "area for runway vehicles" can be a "group risk" of sub-type "injury", "body", and the like; presence of a "luggage handler" in the area of a "maintenance worker" (e.g., near a jet engine) can be an "individual risk" of type "severe injury"; presence of two roles normally not allowed to work at the same time (e.g., "luggage handler" with "maintenance worker") may be the cause of a "group risk" of "injury"; a "grimacing expression" may be evidence of a "wrong posture", which may be the cause of risk of an "injury" on the "body" of an "individual"; and the like.

Using the list of detected objects and attributes, along with their respective scores (i.e., the probability that the objects are correctly detected, from media scene classifier 402, and the scene class-related information from risk taxonomy 426), insight generator 404 can detect the risks represented in the scene and rate those risks. Also, even though media scene classifier 402 may not have discovered any wrong posture, insight generator 404 may be able to deduce that there is such a wrong posture because of a "grimacing expression" and infer a possible risk of bodily injury.

Insight generator 404 can compute the probability of a risk through the number of risk types, causes, and evidences, along with scores from media scene classifier 402. Insight generator 404 detects in media feed 408 the types of risk described in risk taxonomy 426. The risk types become "risk features" with their corresponding scores (i.e., probability the risk feature is real). At 428, insight generator 404 tags media feed 408 with the risk types, and other possible "risk features" (e.g., risk causes and evidences) along with their scores, and passes this information to alert generator 406.

It should be noted that risk taxonomy 426 is modifiable according to user experience or machine learning. Further, risk taxonomy 426 can be enriched with other information, such as, for example, recommendations on how to handle particular risks, which are related to the different risk types, causes, and evidences.

Alert generator 406 receives media feed 408 tagged with the scored scene class, the detected objects, attributes of the detected objects and their corresponding scores, and several categories with their "risk features" and corresponding scores. Alert generator 406 computes a final risk intensity level score based on that information. For example, using weights on the risk features, alert generator 406 may represent the scene as a risk vector in a "risk features" space, compare the risk vector to a standard vector representing a normal "without risk" scene, and compute the distance between the two vectors as the risk intensity level score. Alert generator 406 may compute the standard vector (i.e., no-risk vector) based on information in database of "no-risk" cases 430.

At 432, alert generator 406 sends alerts with risk intensity levels to appropriate personnel. Also, in addition to, or instead of, sending alerts at 432, alert generator 406 may perform other automations at 434. The other automations may include, for example, sending instructions to one or more other automated system to perform their respective functions, such as locking security doors, initiating fire suppression, and the like.

Furthermore, alert generator 406 may utilize thresholds on the final risk intensity level score to determine the magnitude or strength of the alerts, such as, for example, alerts 322 in FIG. 3. Further, alert generator 406 may utilize the "risk features" to detect targets of the alerts. For example, alert generator 406 may directly send an alert to an individual in an airport via a handheld device or via radio broadcast to the individual's headset, send the alert to a supervisor of field operations at the airport, or the like. It should be noted that all weights and thresholds are tunable according to the user experience or machine learning.

Figure 5:
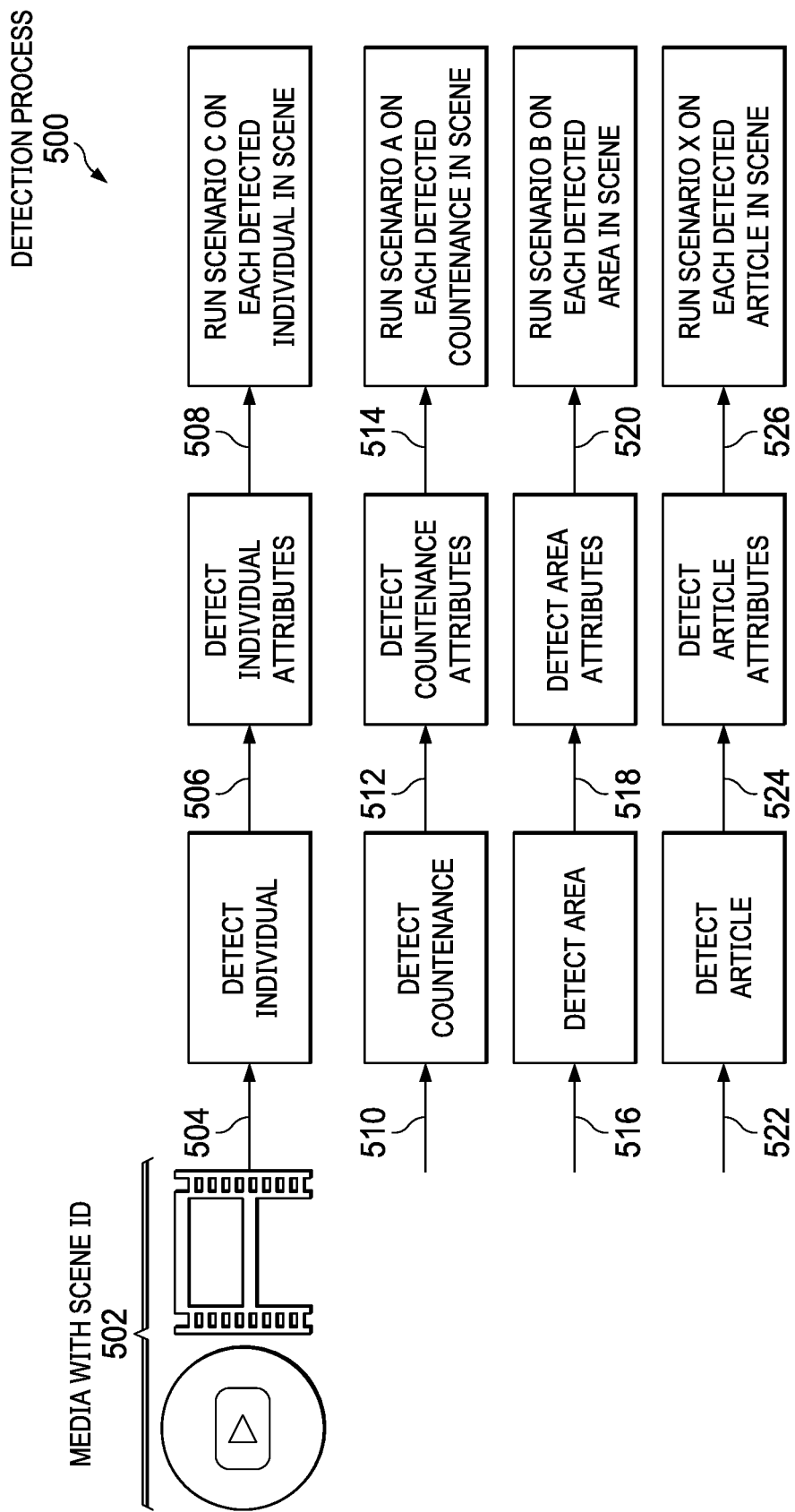
FIG. 5 is a diagram illustrating an example of a detection process in accordance with an illustrative embodiment.

With reference now to FIG. 5, a diagram illustrating an example of a detection process is depicted in accordance with an illustrative embodiment. Detection process 500 may be implemented in a risk manager, such as, for example, risk manager 218 in FIG. 1 or risk manager 400 in FIG. 4. Detection process 500 detects objects, such as individuals, countenances, areas, articles, and the like within a scene, along with their attributes, and then runs corresponding scenarios, such as scenarios 418 in FIG. 4.

Detection process 500 starts with media with scene identifier 502. The media may be, for example, video, picture, audio, or a combination thereof. The media is a real time media feed generated by one or more sensors, such as imaging sensors, sound capturing sensors, and the like, of a scene. In addition, the scene may be any type of scene, such as, for example, an airport baggage loading scene.

At 504, detection process 500 detects one or more individuals in the scene captured by media with scene identifier 502. At 506, detection process 500 detects attributes of each detected individual in the scene. At 508, detection process 500 runs scenario "C", which is a specific scenario for an individual associated with the presumed scene class, on each detected individual in the scene.

At 510, detection process 500 detects one or more countenances in the scene captured by media with scene identifier 502. At 512, detection process 500 detects attributes of each detected countenance in the scene. At 514, detection process 500 runs scenario "A", which is a specific scenario for a countenance associated with the presumed scene class, on each detected countenance in the scene.

At 516, detection process 500 detects one or more areas in the scene captured by media with scene identifier 502. At 518, detection process 500 detects attributes of each detected area in the scene. At 520, detection process 500 runs scenario "B", which is a specific scenario for an area associated with the presumed scene class, on each detected area in the scene.

At 522, detection process 500 detects one or more articles (e.g., items such as luggage, machinery, tools, for the like) in the scene captured by media with scene identifier 502. At 524, detection process 500 detects attributes of each detected article in the scene. At 526, detection process 500 runs scenario "X", which is a specific scenario for an article associated with the presumed scene class, on each detected article in the scene.

It should be noted that detection process 500 may perform detection of objects and their attributes in the scene concurrently in parallel. Alternatively, detection process 500 may perform detection of objects and their attributes in the scene sequentially one by one.

Figure 6:
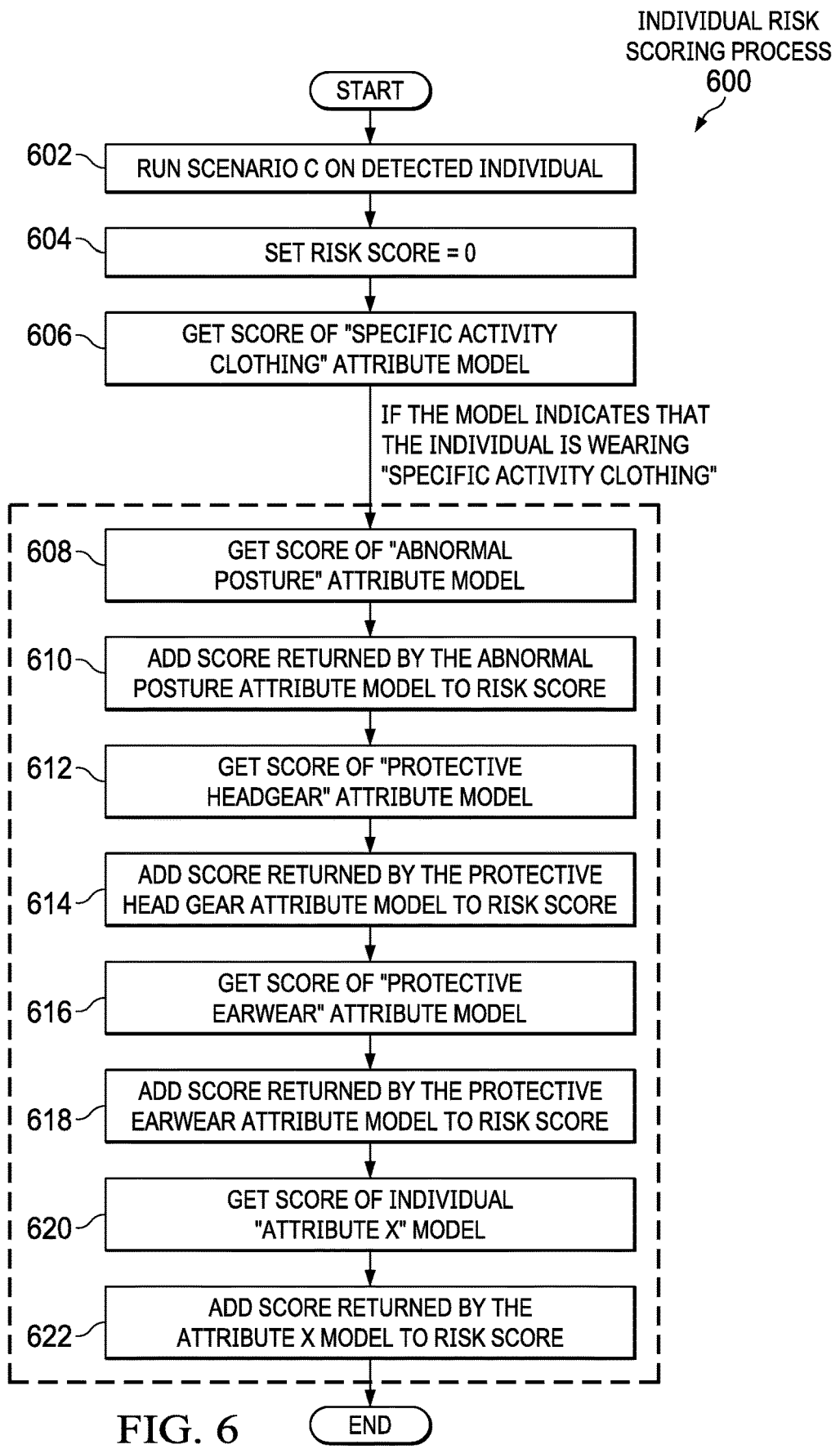
FIG. 6 is a diagram illustrating an example of an individual risk scoring process in accordance with an illustrative embodiment.

With reference now to FIG. 6, a diagram illustrating an example of an individual risk scoring process is depicted in accordance with an illustrative embodiment. Individual risk scoring process 600 may be implemented in a risk manager, such as, for example, risk manager 218 in FIG. 1 or risk manager 400 in FIG. 4. Individual risk scoring process 600 scores the risk to individuals in a scene captured by media, such as, for example, media with scene identifier 502 in FIG. 5.

At 602, individual risk scoring process 600 starts at run scenario "C" on a detected individual in the scene captured by the media. In other words, individual risk scoring process 600 starts where detection process 500 in FIG. 5 ended at 508 running scenario "C" on each detected individual in the scene.

At 604, individual risk scoring process 600 sets the risk score equal to zero for the detected individual. At 606, individual risk scoring process 600 gets a score provided by a "specific activity clothing" attribute model (i.e., if the model indicates that the individual is wearing specific activity clothing, such as, for example, baggage handling clothing at an airport baggage loading scene).

At 608, individual risk scoring process 600 gets a score provided by an "abnormal posture" attribute model. At 610, individual risk scoring process 600 adds the score returned by the abnormal posture attribute model to the risk score for the detected individual.

At 612, individual risk scoring process 600 gets a score provided by an "protective headgear" attribute model. At 614, individual risk scoring process 600 adds the score returned by the protective headgear attribute model to the risk score for the detected individual.

At 616, individual risk scoring process 600 gets a score provided by an "protective earwear" attribute model. At 618, individual risk scoring process 600 adds the score returned by the protective earwear attribute model to the risk score for the detected individual.

At 620, individual risk scoring process 600 gets a score provided by an individual "attribute X" model. Attribute X may represent any specific attribute of the detected individual. At 622, individual risk scoring process 600 adds the score returned by the attribute X model to the risk score for the detected individual.

Figure 7:
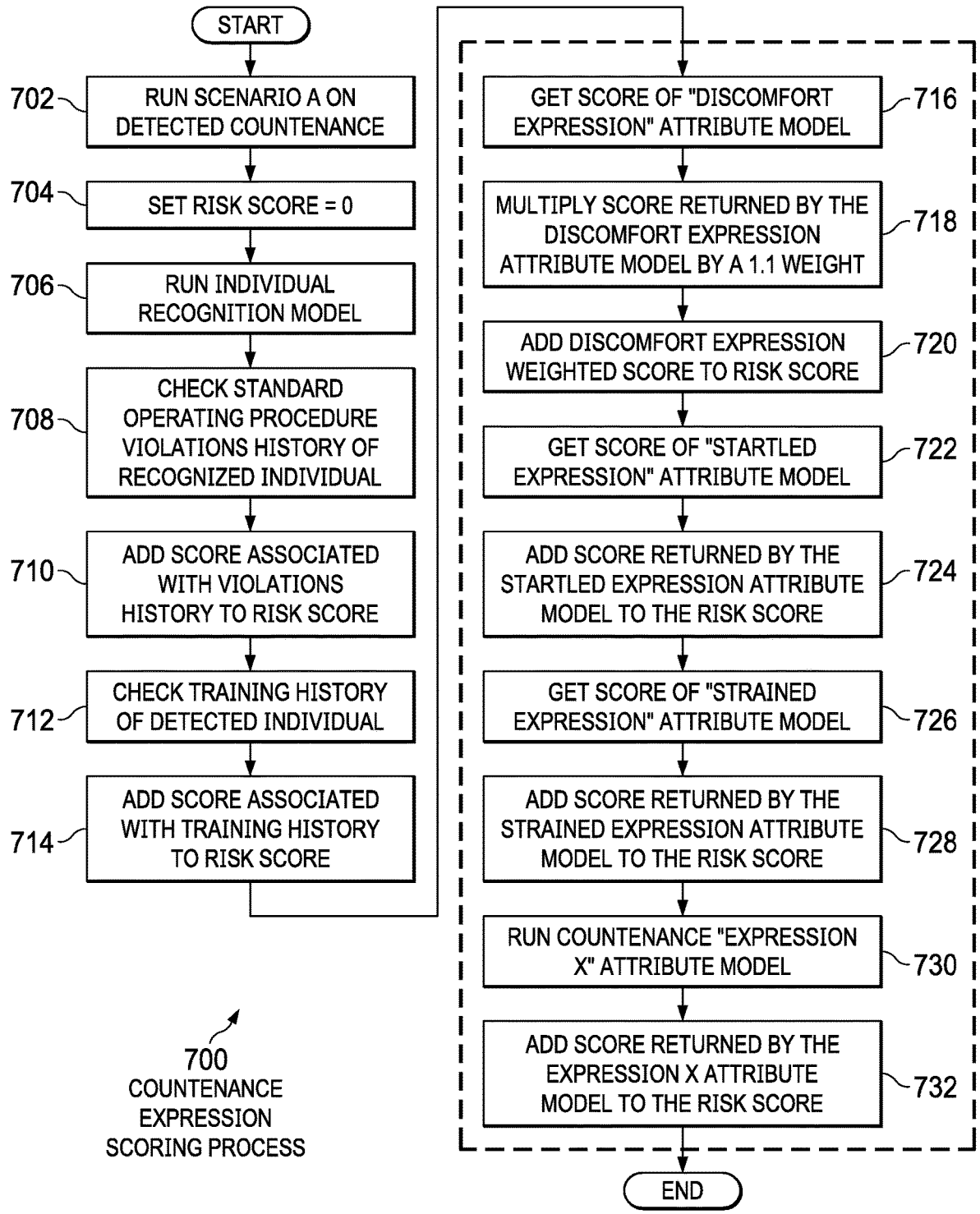
FIG. 7 is a diagram illustrating an example of a countenance expression scoring process in accordance with an illustrative embodiment.

With reference now to FIG. 7, a diagram illustrating an example of a countenance expression scoring process is depicted in accordance with an illustrative embodiment. Countenance expression scoring process 700 may be implemented in a risk manager, such as, for example, risk manager 218 in FIG. 1 or risk manager 400 in FIG. 4. Countenance expression scoring process 700 scores the risk to individuals in a scene captured by media, such as, for example, media with scene identifier 502 in FIG. 5.

At 702, countenance expression scoring process 700 starts at run scenario "A" on a detected countenance in the scene captured by the media. In other words, countenance expression scoring process 700 starts where detection process 500 in FIG. 5 ended at 514 running scenario "A" on each detected countenance in the scene.

At 704, countenance expression scoring process 700 sets the risk score equal to zero. At 706, countenance expression scoring process 700 runs an individual recognition model. At 708, countenance expression scoring process 700 checks a standard operating procedure violations history of the recognized individual. At 710, countenance expression scoring process 700 adds a score associated with the standard operating procedure violations history of the recognized individual to the risk score.

At 712, countenance expression scoring process 700 checks a training history of the recognized individual. At 714, countenance expression scoring process 700 adds a score associated with the training history of the recognized individual to the risk score.

At 716, countenance expression scoring process 700 gets a score provided by a countenance "discomfort expression" attribute model. At 718, countenance expression scoring process 700 multiples the score returned by the countenance discomfort expression attribute model by a 1.1 weight. It should be noted that the weight may be manually adjusted by a user based on experience or automatically adjusted via machine learning. At 720, countenance expression scoring process 700 adds the discomfort expression weighted score to the risk score.

At 722, countenance expression scoring process 700 gets a score provided by a countenance "startled expression" attribute model. At 724, countenance expression scoring process 700 adds the score returned by the countenance startled expression attribute model to the risk score.

At 726, countenance expression scoring process 700 gets a score provided by a countenance "strained expression" attribute model. At 728, countenance expression scoring process 700 adds the score returned by the countenance strained expression attribute model to the risk score.

At 730, countenance expression scoring process 700 get a score provided by a countenance "expression X" attribute model. Attribute X may represent any specific attribute of the detected countenance. At 732, countenance expression scoring process 700 adds the score returned by the countenance expression X attribute model to the risk score of the recognized individual.

Figure 8:
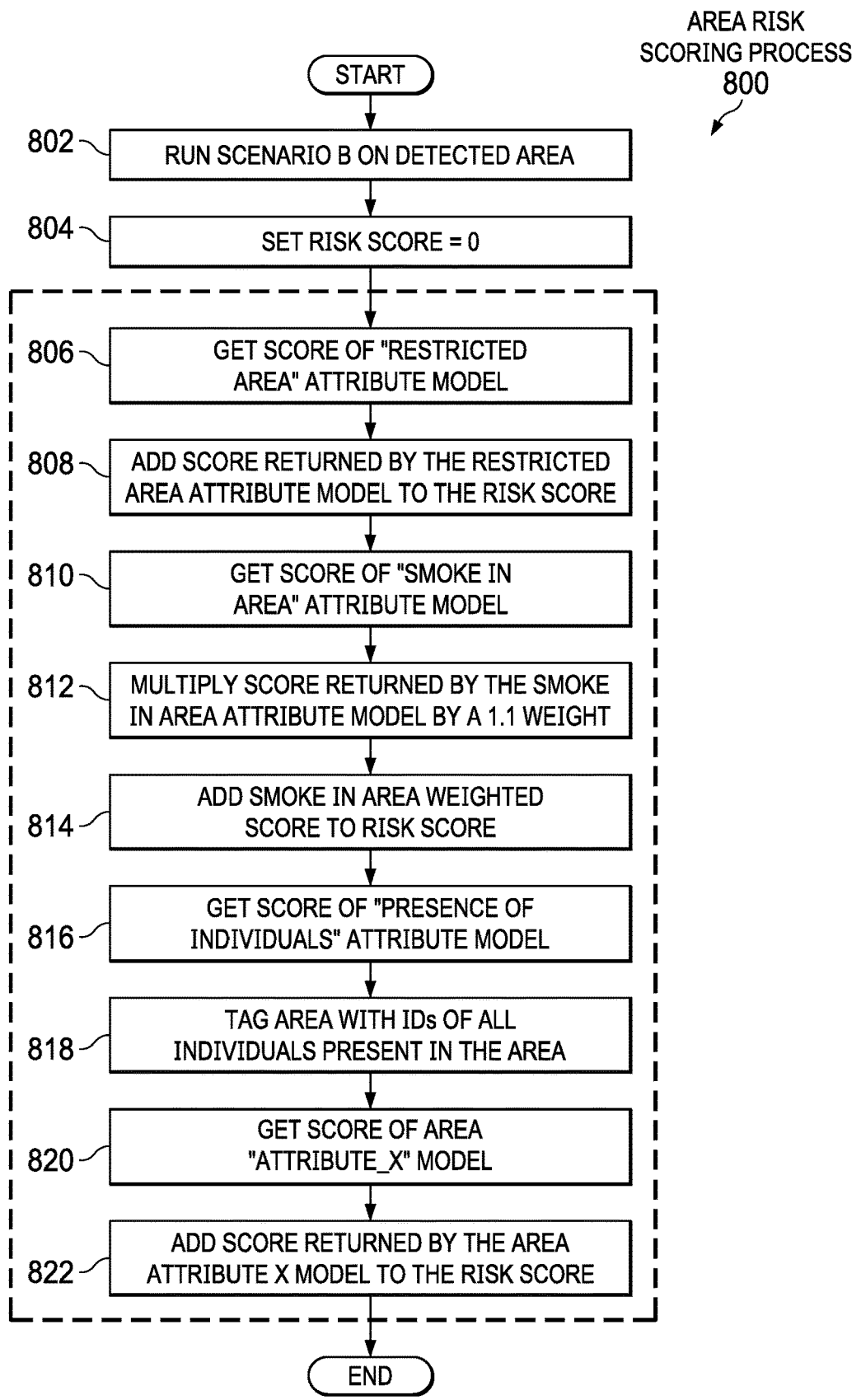
FIG. 8 is a diagram illustrating an example of an area risk scoring process in accordance with an illustrative embodiment.

With reference now to FIG. 8, a diagram illustrating an example of an area risk scoring process is depicted in accordance with an illustrative embodiment. Area risk scoring process 800 may be implemented in a risk manager, such as, for example, risk manager 218 in FIG. 1 or risk manager 400 in FIG. 4. Area risk scoring process 800 scores the risk to areas in a scene captured by media, such as, for example, media with scene identifier 502 in FIG. 5.

At 802, area risk scoring process 800 starts at run scenario "B" on a detected area in the scene captured by the media. In other words, area risk scoring process 800 starts where detection process 500 in FIG. 5 ended at 520 running scenario "B" on each detected area in the scene.

At 804, area risk scoring process 800 sets the risk score equal to zero for the detected area. At 806, area risk scoring process 800 gets a score provided by a "restricted area" attribute model. At 808, area risk scoring process 800 adds the score returned by the restricted area attribute model to the risk score of the detected area.

At 810, area risk scoring process 800 gets a score provided by a "smoke in area" attribute model. At 812, area risk scoring process 800 multiples the score returned by the smoke in area attribute model by a 1.1 weight. It should be noted that the weight may be manually adjusted by a user based on experience or automatically adjusted via machine learning. At 814, area risk scoring process 800 adds the smoke in area weighted score to the risk score of the detected area.

At 816, area risk scoring process 800 gets a score provided by a "presence of individuals in area" attribute model. At 818, area risk scoring process 800 tags the detected area with identifiers of all individuals present in the detected area and adds the score returned by the presence of individuals in area attribute model to the risk score of the detected area.

At 820, area risk scoring process 800 gets a score provided by an area "attribute X" model. Attribute X may represent any specific attribute of the detected area. At 822, area risk scoring process 800 adds the score returned by the area attribute X model to the risk score of the detected area.

Figure 9:
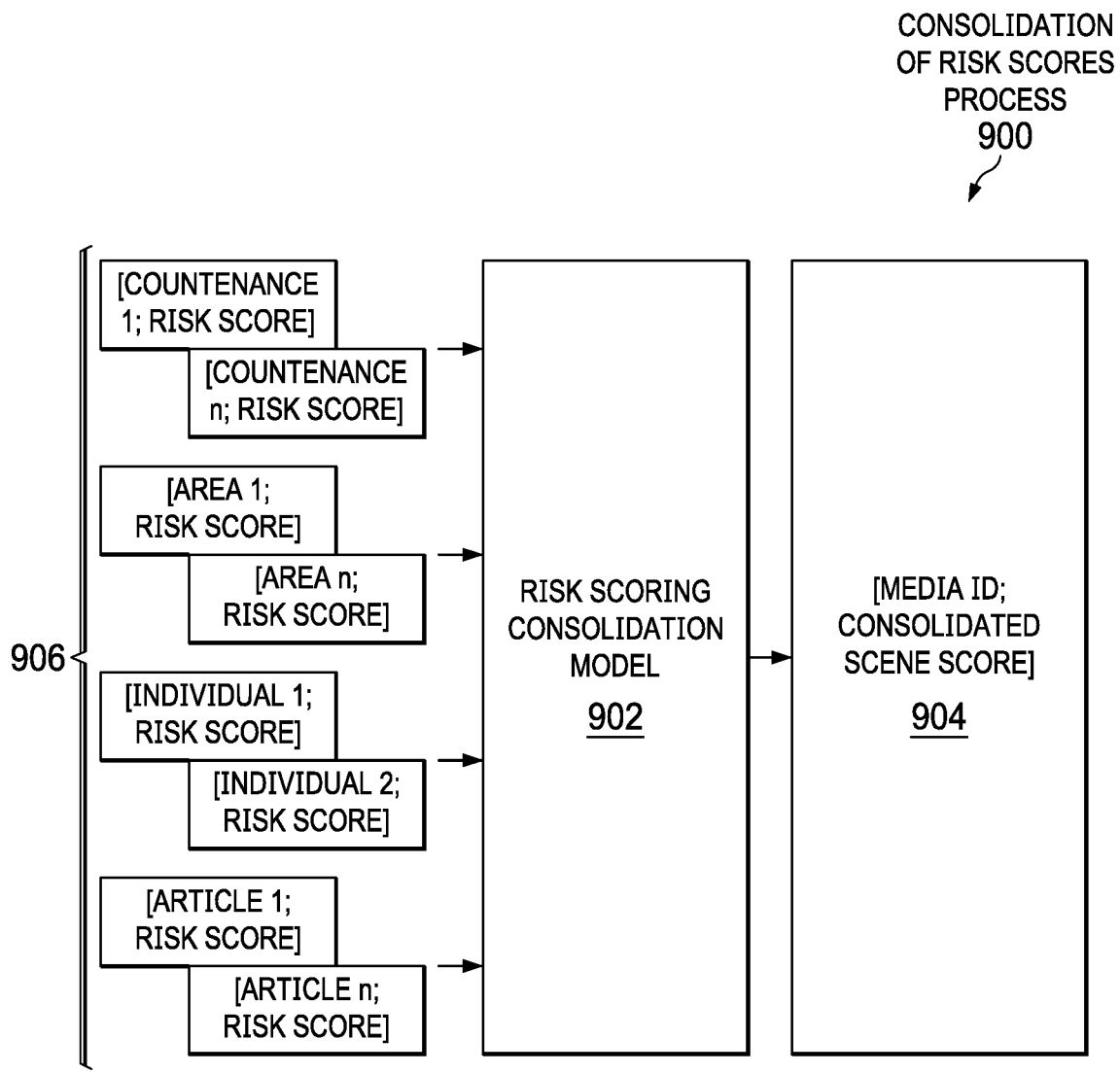
FIG. 9 is a diagram illustrating an example of a consolidation of risk scores process in accordance with an illustrative embodiment.

With reference now to FIG. 9, a diagram illustrating an example of a consolidation of risk scores process is depicted in accordance with an illustrative embodiment. Consolidation of risk scores process 900 may be implemented in a risk manager, such as, for example, risk manager 218 in FIG. 1 or risk manager 400 in FIG. 4. Consolidation of risk scores process 900 consolidates all risk scores corresponding to a scene captured by media, such as, for example, media with scene identifier 502 in FIG. 5.

In this example, consolidation of risk scores process 900 utilizes risk scoring consolidation model 902 to consolidate all of the risk scores corresponding to the risk-related scene captured by the media (into a scene score with media identifier 904). Risk scoring consolidation model 902 may be, for example, risk scoring consolidation model 422 in FIG. 4.

Risk scoring consolidation model 902 utilizes inputs 906 to generate consolidated scene score with media identifier 904. Inputs 906 represent risk scores provided by a plurality of different object attribute scoring models, such as, for example, countenance attribute scoring models, area attribute scoring models, individual attribute scoring models, article attribute scoring models, and the like.

As an alternative to utilizing risk scoring consolidation model 902, consolidation of risk scores process 900 can utilize one or more rule sets that are tunable by user experience or machine learning. For example: one "strained expression" attribute and one "dangerous gesture" attribute corresponding to a same individual identifier can cause consolidation of risk scores process 900 to multiply each object risk score by 1.2 before adding all risk scores in the consolidation based on a particular rule. As another example, one "stressed expression" attribute and one "no protective headgear" attribute corresponding to the same individual identifier can cause consolidation of risk scores process 900 to multiply each object risk score by 1.1 before adding all risk scores in the consolidation based on another rule. As a further example, one "baggage handler" in a "jet engine area" having a "restricted area" attribute can cause consolidation of risk scores process 900 to multiply each object risk score by 1.5 before adding all risk scores in the consolidation based on a further rule.

Figure 10:
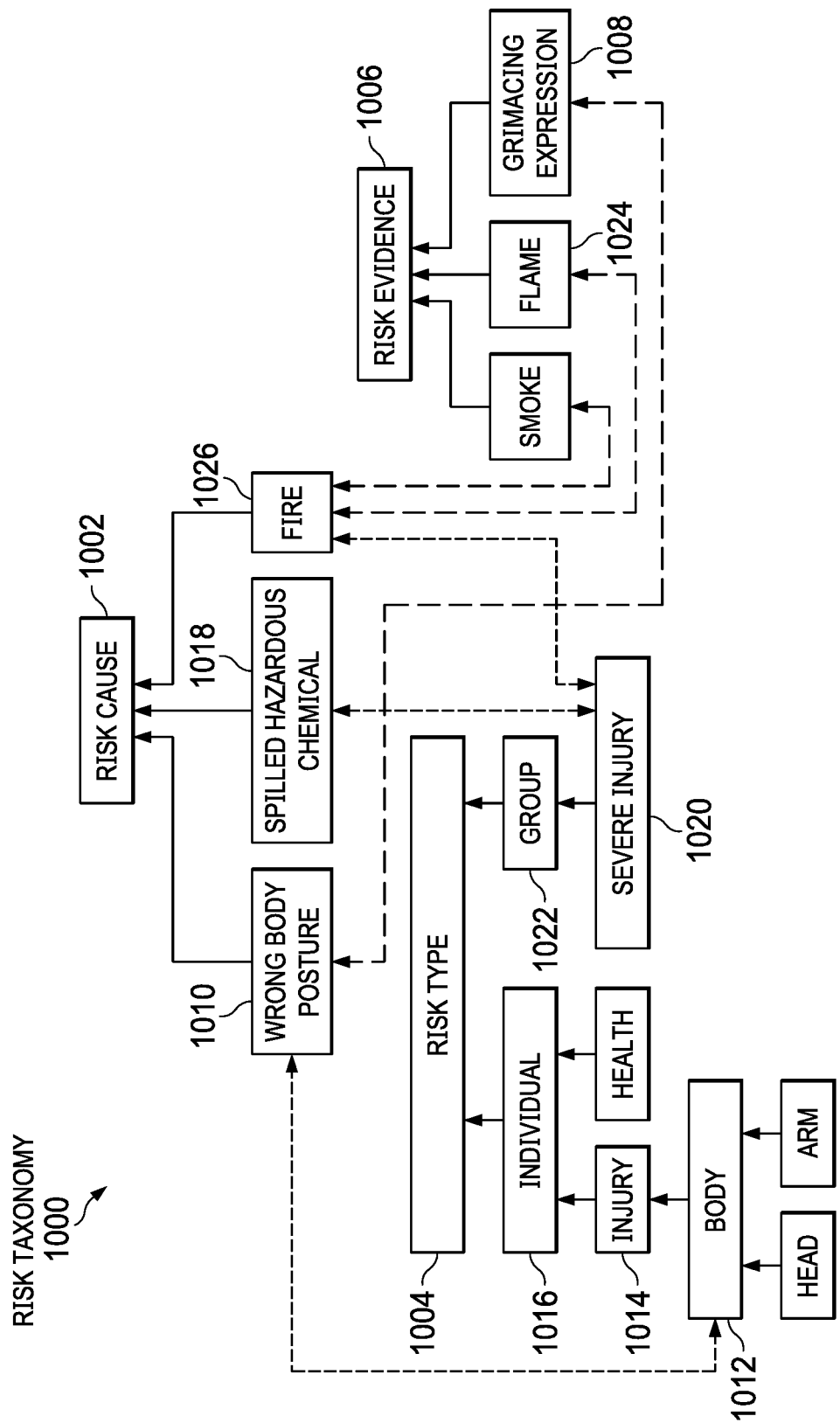
FIG. 10 is a diagram illustrating a specific example of a risk taxonomy in accordance with an illustrative embodiment.

With reference now to FIG. 10, a diagram illustrating a specific example of a risk taxonomy is depicted in accordance with an illustrative embodiment. Risk taxonomy 1000 may be utilized by an insight generator, such as, for example, insight generator 404 in FIG. 4. In addition, risk taxonomy 1000 may be, for example, risk taxonomy 426 in FIG. 4. Further, it should be noted that risk taxonomy 1000 is specific to a particular scene class. In this example, risk taxonomy 1000 includes risk cause 1002, risk type 1004, and risk evidence 1006.

Using risk taxonomy 1000, if an object attribute in the scene matches with the taxon "grimacing expression" 1008 of risk evidence 1006, then the insight generator assigns a risk record (e.g., object identifier, object type, object risk score, attribute (i.e., "grimacing expression" 1008), attribute score) to the taxon "WRONG BODY POSTURE" 1010 of risk cause 1002, along with "BODY" 1012, "INJURY" 1014, and "INDIVIDUAL" 1016 of risk type 1004. Also, if an attribute in the scene matches with "SPILLED HAZARDOUS CHEMICAL" 1018, then the insight generator assigns a risk record (e.g., object identifier, object type, object risk score, attribute (i.e., "SPILLED HAZARDOUS CHEMICAL" 1018), attribute score) to the taxon "SPILLED HAZARDOUS CHEMICAL" 1018 of risk cause 1002, along with "SEVERE INJURY" 1020 and "GROUP" 1022 of risk type 1004. Further, if an attribute in the scene matches with "FLAME" 1024 of risk evidence 1006, then the insight generator assigns a risk record (e.g., object identifier, object type, object risk score, attribute (i.e., "FLAME" 1024), attribute score) to the taxon "FIRE" 1026 of risk cause 1002, along with "SEVERE INJURY" 1020 and "GROUP" 1022 of risk type 1004. With all risk records assigned to the taxons, the insight generator (e.g., insight generator 404 in FIG. 4) can compute a score (i.e., probability of occurrence) for each risk type, cause, or evidence. In this example, the insight generator assigns two risk records with the risk sub-types "SEVERE INJURY" 1020 and "GROUP" 1022, thereby enforcing the probability of severe injury in a group corresponding to that particular scene class.

Figure 11A:
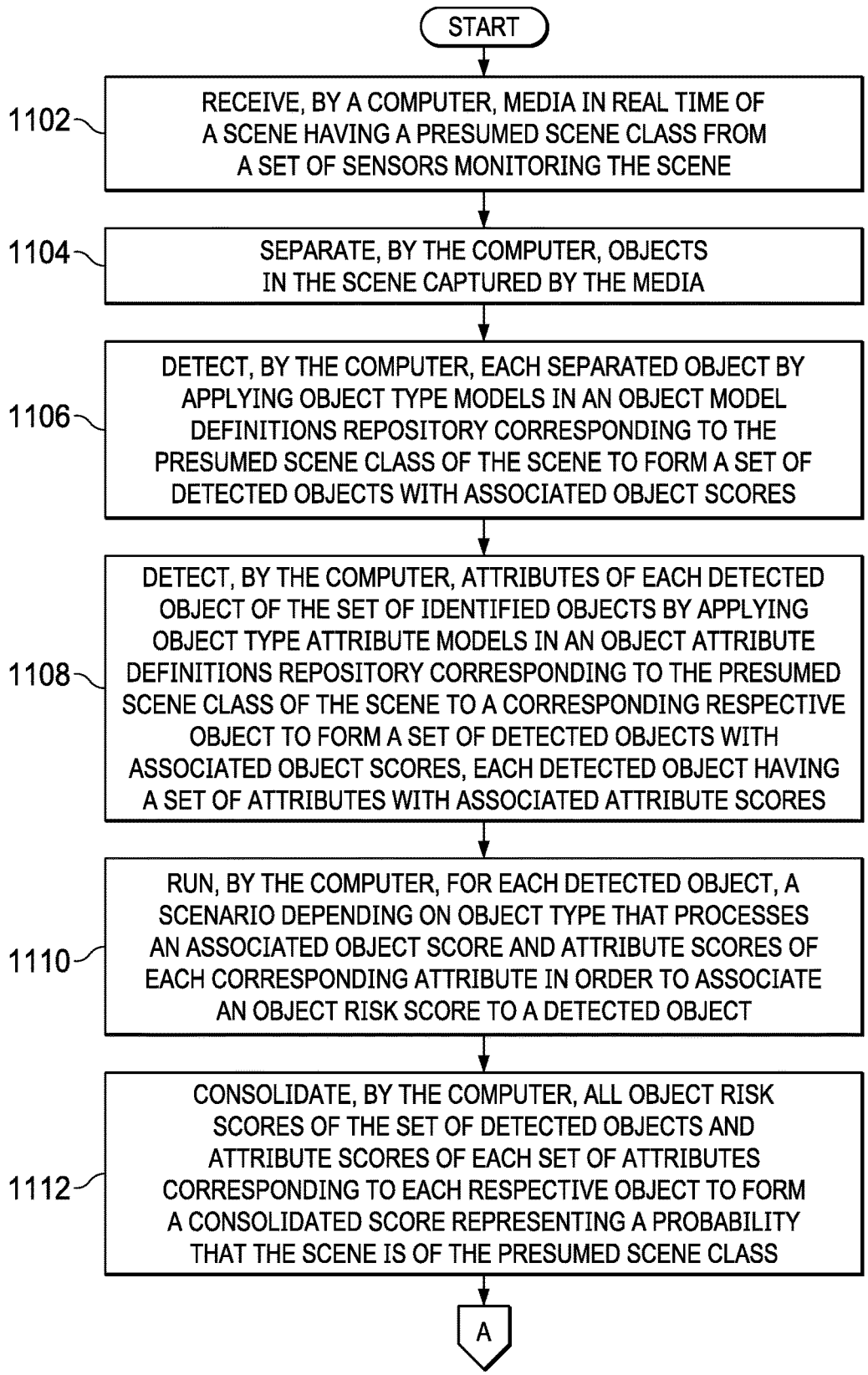
FIGS. 11A and 11B are a flowchart illustrating a process for measuring risk intensity level of a scene captured within media in accordance with an illustrative embodiment.
Figure 11B:
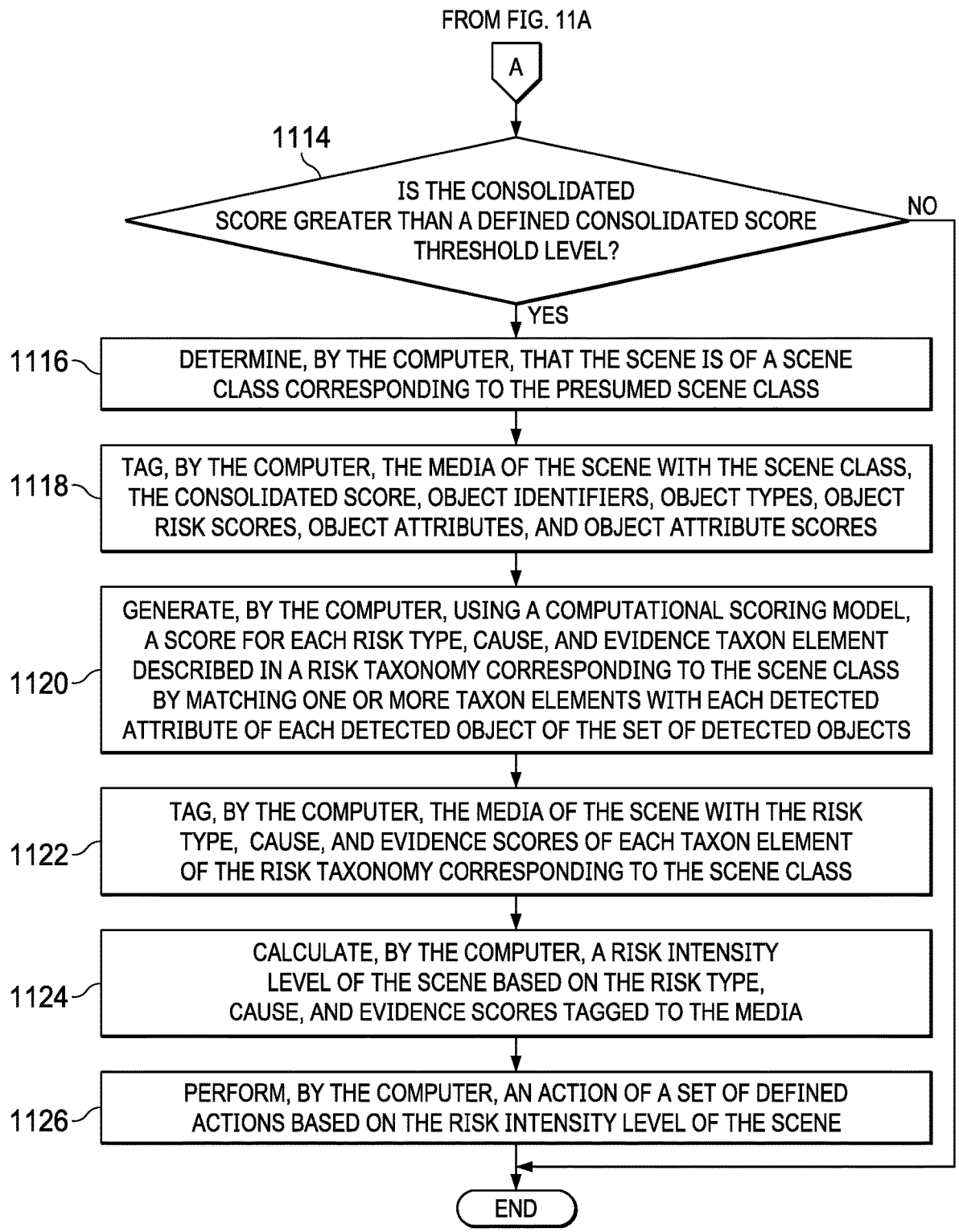

With reference now to FIGS. 11A and 11B, a flowchart illustrating a process for measuring risk intensity level of a scene captured within media are shown in accordance with an illustrative embodiment. The process shown in FIGS. 11A and 11B may be implemented in a computer, such as, for example, server 104 in FIG. 1 or data processing system 200 in FIG. 2.

The process begins when the computer receives media in real time of a scene having a presumed scene class from a set of sensors monitoring the scene (step 1102). The computer separates objects in the scene captured by the media (step 1104).

The computer then detects each separated object by applying object type models in an object model definitions repository corresponding to the presumed scene class of the scene to form a set of detected objects with associated object scores (step 1106). For example, for every separated object in the scene, the computer applies one by one the object type models in the object model definitions repository corresponding to the presumed scene class of the scene. Each respective object type model generates an object score representing the probability that the separated object is of that object type corresponding the model. The computer discards all separated objects that have an object score less than a defined object score threshold level. For each separated object in the scene with at least one object score greater than the defined object score threshold level, the computer selects as the object type for a particular separated object the object type which corresponds to the object type model generating the highest object score for that particular separated object. Then, the computer assigns an identifier to that particular separated object. As a result, the computer identifies each detectable separated object with an identifier, a corresponding object type, and associated object score.

Afterward, the computer detects attributes of each detected object of the set of detected objects by applying object type attribute models in an object attribute definitions repository corresponding to the presumed scene class of the scene to a corresponding respective object to form a set of detected objects with associated object scores, each detected object having a set of attributes with associated attribute scores (step 1108). For example, for every detected object of the set of detected objects, the computer applies one by one the object type attribute models in the object attribute definitions repository corresponding to the presumed scene class of the scene. Each object type attribute model generates an attribute score representing the probability that a particular detected object has that particular attribute corresponding to the model. In addition, the computer runs, for each detected object, a scenario depending on object type that processes an associated object score and attribute scores of each corresponding attribute in order to associate an object risk score to a detected object (step 1110). It should be noted that the object type scenario can assign different weights to different attributes, depending on the presumed scene class of the scene. Then, the computer assigns the final object risk score to that particular detected object. As a result, the computer defines each respective detected object as having an object score, an object risk score, and a set of attributes, each attribute in the set with its own attribute score.

The computer consolidates all object risk scores of the set of detected objects and attribute scores of each set of attributes corresponding to each respective object using a risk scoring consolidation model corresponding to the presumed scene class to form a consolidated score representing a probability that the scene is of the presumed scene class (step 1112). The risk scoring consolidation model can be by default a simple formula that adds all attribute scores weighted by their corresponding object risk score and normalizes the consolidated score result. The computer makes a determination as to whether the consolidated score is greater than a defined consolidated score threshold level (step 1114). The defined consolidated score threshold level is a minimum threshold level tunable based on user experience or machine learning.

If the computer determines that the consolidated score is less than or equal to the defined consolidated score threshold level, no output of step 1114, then the process terminates thereafter. If the computer determines that the consolidated score is greater than the defined consolidated score threshold level, yes output of step 1114, then the computer determines that the scene is of a scene class corresponding to the presumed scene class (step 1116).

Afterward, the computer tags the media of the scene with the scene class, the consolidated score, object identifiers, object types, object risk scores, object attributes, and object attribute scores (step 1118). In addition, the computer generates, using a computational scoring model, a score for each risk type, cause, and evidence taxon element described in a risk taxonomy corresponding to the scene class by matching one or more taxon elements with each detected attribute of each detected object of the set of detected objects (step 1120).

For example, for each respective attribute of each detected object, the computer builds a risk record, which includes the object identifier, object type, object risk score, attribute identifier, and attribute score. For each risk type in the risk taxonomy corresponding to the scene class, the computer determines whether a particular attribute of a detected object matches a particular risk type. If the computer determines that a particular attribute of a detected object matches a particular risk type, then the computer assigns the risk record of that particular attribute to that particular risk type. Further, the computer assigns the risk record of that particular attribute to each of the risk taxonomy parents of that particular risk type.

For each risk cause in the risk taxonomy, the computer determines whether a particular attribute of a detected object matches a particular risk cause. If the computer determines that a particular attribute of a detected object matches a particular risk cause, then the computer assigns the risk record of that particular attribute to that particular risk cause. Further, the computer assigns that particular attribute's risk record to each of the risk taxonomy parents of that particular risk cause. Furthermore, the computer detects all risk types corresponding to that particular risk cause, as described in the risk taxonomy. For each risk type corresponding to that particular risk cause, the computer assigns that particular attribute's risk record to each particular risk type. The computer also assigns that particular attribute's risk record to each of the risk taxonomy parents of that particular risk type.

For each risk evidence in the risk taxonomy corresponding to the scene class, the computer determines whether a particular attribute of a detected object matches a particular risk evidence. If the computer determines that a particular attribute of a detected object matches a particular risk evidence, then the computer detects all corresponding risk causes, as described in the risk taxonomy. For each corresponding risk cause, the computer assigns the risk record of that particular attribute to the corresponding risk causes. Further, the computer assigns that particular attribute's risk record to each of the risk taxonomy parents of that particular corresponding risk cause. Furthermore, the computer detects all risk types corresponding to the risk causes, as described in the risk taxonomy. For each detected risk type, the computer assigns that particular attribute's risk record to the detected risk types. The computer also assigns that particular attribute's risk record to each of the taxonomy parents of the detected risk type.

For each risk type described in the risk taxonomy corresponding to the scene class, the computer generates a risk type score based on all risk records assigned to that particular risk type. By default, the risk type score for a particular risk type can equal the sum of attribute scores in the risk records assigned to that particular risk type, weighted by the corresponding object risk score. For each risk cause described in the risk taxonomy corresponding to the scene class, the computer generates a risk cause score based on all risk records assigned to that particular risk cause. By default, the risk cause score can be equal to the sum of attribute scores in the risk records assigned to that particular risk cause, weighted by the corresponding object risk score. For each risk evidence described in the risk taxonomy corresponding to the scene class, the computer generates a risk evidence score based on all risk records assigned to a particular risk evidence. By default, the risk evidence score can be equal to the sum of attribute scores in the risk records assigned to that particular risk evidence, weighted by the corresponding object risk score.

Subsequently, the computer tags the media of the scene with the risk type, cause, and evidence scores of each taxon element of the risk taxonomy corresponding to the scene class (step 1122). The computer utilizes the risk types, risk causes, and risk evidences of the taxon elements, for which there is a corresponding score, as risk features or dimensions of a risk space corresponding to the scene. The computer also generates a risk vector in the risk space where coordinates of the risk vector are one or more of the risk type scores, the risk cause scores, and the risk evidence scores.

Moreover, the computer calculates a risk intensity level of the scene based on the risk type, cause, and evidence scores tagged to the media (step 1124). For example, the computer builds a no-risk vector in the risk space corresponding to the scene using information in a historical database of known no-risk cases corresponding to the scene class of the scene. The computer compares the risk vector generated above with the no-risk vector to calculate the risk intensity level of the scene. The computer can calculate the risk intensity level of the scene as the distance between the risk vector and the no-risk vector (e.g., by the dot product).

Afterward, the computer performs an action of a set of defined actions based on the risk intensity level of the scene (step 1126). It should be noted that an action in the set of defined actions may be take no action. For example, if the computer determines that the risk intensity level of the scene is less than a defined risk intensity level threshold, then the computer can take no action as a response. Alternatively, if the computer determines that the risk intensity level of the scene is greater than or equal to the defined risk intensity level threshold, then the computer can run a decision tree checking the risk intensity level, the risk causes, the risk types, the risk evidences, along with their respective scores, to trigger an appropriate action. An action can consist of a set of instructions that are actionable by an external automation engine. The set of instructions may include, for example, open a door or window to evacuate smoke, activate a fire suppression system, send an alert to appropriate personnel, such as a security guard, and the like. Thereafter, the process terminates.

Further, it should be noted that the computer can normalize all scores using existing techniques. Also, the risk scoring consolidation model can be a set of rules provided by an experienced user. Alternatively, the set of rules can be provided by another machine learning model. Risk insights provided by the risk taxonomy can be complemented by the set of rules (e.g., taking into account that a combination of object attributes might increase or decrease a particular score of risk type, risk cause or risk evidence). Calculating the risk intensity level of a scene is self-learning based on a no-risk vector that can benefit from a historical database of no-risk cases corresponding to a particular scene class. The computer can also use an history of risk vectors. In addition, the computer can use simple rule-based systems or formulas. Furthermore, all thresholds and weights are tunable according to the end-user experience or machine learning. Moreover, the computer can detect and analyze any type of scene, provided machine learning models, scenarios, and a risk taxonomy are provided for that particular type of scene. Additionally, the computer can store the media for future reference when the computer determines that legal or criminal activities are in progress or are predicted.

Thus, illustrative embodiments of the present invention provide a computer-implemented method, computer system, and computer program product for measuring risk intensity level of a scene captured within media and performing a set of actions based on the measured risk intensity level. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for measuring risk intensity level of a scene captured within media, the computer-implemented method comprising:
    generating, by a computer, using a computational scoring model, a score for each risk type, cause, and evidence taxon element described in a risk taxonomy corresponding to a scene class by matching one or more taxon elements with each attribute of each detected object of a set of detected objects within the scene captured by the media, wherein the scene captured within media relates to an area in a building;
    tagging, by the computer, the media of the scene with risk type, cause, and evidence scores of each taxon element of the risk taxonomy corresponding to the scene class;
    calculating, by the computer, a risk intensity level of the scene based on the risk type, cause, and evidence scores tagged to the media;
    detecting, by the computer, a number of targets based on the risk type, cause, and evidence; and
    sending, by the computer, a number of alerts based on the risk intensity level of the scene to the number of targets, wherein magnitudes for the number of alerts are determined based on a threshold for the risk intensity level.

2. The computer-implemented method of claim 1 further comprising:
    receiving, by the computer, the media in real time of the scene having a presumed scene class from a set of sensors monitoring the scene;
    separating, by the computer, objects in the scene captured by the media; and
    detecting, by the computer, each separated object by applying object type models corresponding to the presumed scene class of the scene to form a set of detected objects with associated object scores.

3. The computer-implemented method of claim 2 further comprising:
    for every separated object in the scene, applying, by the computer, one by one the object type models corresponding to the presumed scene class of the scene, each respective object type model generating an object score representing a probability that a separated object is of that object type corresponding the object type model;
    discarding, by the computer, all separated objects that have an object score less than a defined object score threshold level;
    for each separated object in the scene with at least one object score greater than the defined object score threshold level, selecting, by the computer, as the object type for a particular separated object the object type which corresponds to an object type model generating a highest object score for that particular separated object; and
    assigning, by the computer, an identifier to that particular separated object, wherein each detectable separated object has an identifier, a corresponding object type, and associated object score.

4. The computer-implemented method of claim 2 further comprising:
    detecting, by the computer, attributes of each detected object of the set of detected objects by applying object type attribute models corresponding to the presumed scene class of the scene to a corresponding respective object to form a set of detected objects with associated object scores, each detected object having a set of attributes with associated attribute scores.

5. The computer-implemented method of claim 4 further comprising:
    for every detected object of the set of detected objects, applying, by the computer, one by one the object type attribute models corresponding to the presumed scene class of the scene, each object type attribute model generating an attribute score representing a probability that a particular detected object has that particular attribute corresponding to the object type attribute model;
    running, by the computer, an object type scenario corresponding to an object type of that particular detected object, which uses as input generated attribute scores values and returns as output a final object risk score, wherein the object type scenario can assign different weights to different attributes depending on the presumed scene class of the scene; and
    assigning, by the computer, the final object risk score to that particular detected object, wherein each respective detected object has an object score and a set of attributes, each attribute in the set having its own attribute score.

6. The computer-implemented method of claim 4 further comprising:
    consolidating, by the computer, all object risk scores of the set of detected objects and attribute scores of each set of attributes corresponding to each respective object using a risk scoring consolidation model corresponding to the presumed scene class to form a consolidated score representing a probability that the scene is of the presumed scene class.

7. The computer-implemented method of claim 6 further comprising:
    determining, by the computer, whether the consolidated score is greater than a defined consolidated score threshold level;
    responsive to the computer determining that the consolidated score is greater than the defined consolidated score threshold level, determining, by the computer, that the scene is of the scene class corresponding to the presumed scene class; and
    tagging, by the computer, the media of the scene with the scene class, the consolidated score, object identifiers, object types, object risk scores, object attributes, and object attribute scores.

8. The computer-implemented method of claim 1 further comprising:
    utilizing, by the computer, risk types, risk causes, and risk evidences of the taxon elements, for which there is a corresponding score, as risk features of a risk space corresponding to the scene;

generating, by the computer, a risk vector in the risk space corresponding to the scene where coordinates of the risk vector are one or more of risk type scores, risk cause scores, and risk evidence scores;

building, by the computer, a no-risk vector in the risk space corresponding to the scene using information in a historical database of known no-risk cases corresponding to the scene class of the scene; and comparing, by the computer, the risk vector with the no-risk vector to calculate the risk intensity level of the scene; and calculating, by the computer, the risk intensity level of the scene as a distance between the risk vector and the no-risk vector based on the comparing.

9. The computer-implemented method of claim 1 further comprising:

determining, by the computer, whether the risk intensity level of the scene is greater than or equal to a defined risk intensity level threshold; and responsive to the computer determining that the risk intensity level of the scene is greater than or equal to the defined risk intensity level threshold, running, by the computer, a decision tree checking the risk intensity level, risk causes, risk types, and risk evidences, along with their respective scores, to trigger an appropriate action.

10. The computer-implemented method of claim 1 further comprising:

for each respective attribute of each detected object, building, by the computer, a risk record for each respective attribute that includes an object identifier, object type, object risk score, attribute identifier, and attribute score;

assigning, by the computer, risk records to the taxon elements of the risk taxonomy corresponding to the scene class; and calculating, by the computer, a score for each taxon element based on corresponding assigned risk records.

11. A computer system for measuring risk intensity level of a scene captured within media, the computer system comprising:

a bus system;

a storage device connected to the bus system, wherein the storage device stores program instructions; and a processor connected to the bus system, wherein the processor executes the program instructions to:

generate, using a computational scoring model, a score for each risk type, cause, and evidence taxon element described in a risk taxonomy corresponding to a scene class by matching one or more taxon elements with each attribute of each detected object of a set of detected objects within the scene captured by the media, wherein the scene captured within media relates to an area in a building;

tag the media of the scene with risk type, cause, and evidence scores of each taxon element of the risk taxonomy corresponding to the scene class;

calculate a risk intensity level of the scene based on the risk type, cause, and evidence scores tagged to the media;

detect a number of targets based on the risk type, cause, and evidence; and sending a number of alerts based on the risk intensity level of the scene to the number of targets, wherein magnitudes for the number of alerts are determined based on a threshold for the risk intensity level.

12. The computer system of claim 11, wherein the processor further executes the program instructions to:

receive the media in real time of the scene having a presumed scene class from a set of sensors monitoring the scene;

separate objects in the scene captured by the media; and detect each separated object by applying object type models corresponding to the presumed scene class of the scene to form a set of detected objects with associated object scores.

13. The computer system of claim 12, wherein the processor further executes the program instructions to:

for every separated object in the scene, apply one by one the object type models corresponding to the presumed scene class of the scene, each respective object type model generating an object score representing a probability that a separated object is of that object type corresponding the object type model;

discard all separated objects that have an object score less than a defined object score threshold level;

for each separated object in the scene with at least one object score greater than the defined object score threshold level, select as the object type for a particular separated object the object type which corresponds to an object type model generating a highest object score for that particular separated object; and assign an identifier to that particular separated object, wherein each detectable separated object has an identifier, a corresponding object type, and associated object score.

14. The computer system of claim 12, wherein the processor further executes the program instructions to:

detect attributes of each detected object of the set of detected objects by applying object type attribute models corresponding to the presumed scene class of the scene to a corresponding respective object to form a set of detected objects with associated object scores, each detected object having a set of attributes with associated attribute scores.

15. The computer system of claim 14, wherein the processor further executes the program instructions to:

for every detected object of the set of detected objects, apply one by one the object type attribute models corresponding to the presumed scene class of the scene, each object type attribute model generating an attribute score representing a probability that a particular detected object has that particular attribute corresponding to the object type attribute model;

run an object type scenario corresponding to an object type of that particular detected object, which uses as input generated attribute score values and returns as output a final object risk score, wherein the object type scenario can assign different weights to different attributes depending on the presumed scene class of the scene; and assign the final object risk score to that particular detected object, wherein each respective detected object has an object score and a set of attributes, each attribute in the set having its own attribute score.

16. A computer program product for measuring risk intensity level of a scene captured within media, the computer program product comprising a computer readable storage medium having program instructions embodied therewith, the program instructions executable by a computer to cause the computer to perform a method comprising:

generating, by the computer, using a computational scoring model, a score for each risk type, cause, and evidence taxon element described in a risk taxonomy corresponding to a scene class by matching one or more taxon elements with each attribute of each detected object of a set of detected objects within the scene captured by the media, wherein the scene captured within media is related to an area in a building;

tagging, by the computer, the media of the scene with risk type, cause, and evidence scores of each taxon element of the risk taxonomy corresponding to the scene class;

calculating, by the computer, a risk intensity level of the scene based on the risk type, cause, and evidence scores tagged to the media;

detecting, by the computer, a number of targets based on the risk type, cause, and evidence; and sending, by the computer, a number of alerts based on the risk intensity level of the scene to the number of targets, wherein magnitudes for the number of alerts are determined based on a threshold for the risk intensity level.

17. The computer program product of claim 16 further comprising:
receiving, by the computer, the media in real time of the scene having a presumed scene class from a set of sensors monitoring the scene;
separating, by the computer, objects in the scene captured by the media; and
detecting, by the computer, each separated object by applying object type models corresponding to the presumed scene class of the scene to form a set of detected objects with associated object scores.

18. The computer program product of claim 17 further comprising:
for every separated object in the scene, applying, by the computer, one by one the object type models corresponding to the presumed scene class of the scene, each respective object type model generating an object score representing a probability that a separated object is of that object type corresponding the object type model;
discarding, by the computer, all separated objects that have an object score less than a defined object score threshold level;
for each separated object in the scene with at least one object score greater than the defined object score threshold level, selecting, by the computer, as the object type for a particular separated object the object type which corresponds to an object type model generating a highest object score for that particular separated object; and
assigning, by the computer, an identifier to that particular separated object, wherein each detectable separated object has an identifier, a corresponding object type, and associated object score.

19. The computer program product of claim 17 further comprising:
detecting, by the computer, attributes of each detected object of the set of detected objects by applying object type attribute models corresponding to the presumed scene class of the scene to a corresponding respective object to form a set of detected objects with associated object scores, each detected object having a set of attributes with associated attribute scores.

20. The computer program product of claim 19 further comprising:
for every detected object of the set of detected objects, applying, by the computer, one by one the object type attribute models corresponding to the presumed scene class of the scene, each object type attribute model generating an attribute score representing a probability that a particular detected object has that particular attribute corresponding to the object type attribute model;
running, by the computer, an object type scenario corresponding to an object type of that particular detected object, which uses as input generated attribute scores values and returns as output a final object risk score, wherein the object type scenario can assign different weights to different attributes depending on the presumed scene class of the scene; and
assigning, by the computer, the final object risk score to that particular detected object, wherein each respective detected object has an object score and a set of attributes, each attribute in the set having its own attribute score.

* * * * *